US012748221B2

(12) United States Patent
Dunham et al.

(10) Patent No.: US 12,748,221 B2
(45) Date of Patent: Sep. 29, 2026

(54) NON-RADIOISOTOPE NEUTRON DEVICE

(71) Applicant: Xelera Research LLC, Ithaca, NY (US)

(72) Inventors: Bruce Dunham, Redwood City, CA (US); John Scott Price, Niskayuna, NY (US); Vaclav Kostroun, Ithaca, NY (US)

(73) Assignee: Xelera Research LLC, Ithaca, NY (US)

( * ) Notice: Subject to any disclaimer, the term of this patent is extended or adjusted under 35 U.S.C. 154(b) by 206 days.

(21) Appl. No.: 18/638,066

(22) Filed: Apr. 17, 2024

(65) Prior Publication Data

US 2024/0345267 A1 Oct. 17, 2024

Related U.S. Application Data

(60) Provisional application No. 63/459,805, filed on Apr. 17, 2023.

(51) Int. Cl.
*G01T 1/167* (2006.01)
*G01T 3/00* (2006.01)

(52) U.S. Cl.
CPC ................ *G01T 1/167* (2013.01); *G01T 3/00* (2013.01)

(58) Field of Classification Search
CPC .............. G01T 1/167; G01T 3/00; G01V 5/10
See application file for complete search history.

(56) References Cited

U.S. PATENT DOCUMENTS 6,141,395 A * 10/2000 Nishimura ............... H05H 3/06 376/116
2015/0181688 A1* 6/2015 Perkins .................... G21B 1/11 250/269.1
2018/0049305 A1* 2/2018 Navarro-Sorroche ....................... G01V 5/102
2018/0261349 A1* 9/2018 Perkins .................... G21G 4/02

* cited by examiner

*Primary Examiner* — Uzma Alam
*Assistant Examiner* — Richard O Toohey
(74) *Attorney, Agent, or Firm* — Fishman Stewart PLLC

(57) ABSTRACT

A neutron device may include a neutron emitter. The neutron emitter may include a target, an electron source, and a vacuum space in which ionization gas is disposed. The electron source may be configured to emit electrons toward the target when a voltage is applied between the target and the electron source. The vacuum space may be disposed between the target and the electron source. Reaction ions may be released when the electrons interact with the ionization gas. Neutrons may be emitted from the target when the reaction ions contact the target.

20 Claims, 10 Drawing Sheets

NON-RADIOISOTOPE NEUTRON DEVICE

CROSS-REFERENCE TO RELATED APPLICATIONS

This application claims priority to U.S. Provisional Patent Application No. 63/459,805, filed on Apr. 17, 2023, the contents of which is hereby incorporated by reference in its entirety.

TECHNICAL FIELD

The present disclosure generally relates to non-radioisotope-based neutron devices, such as neutron devices including a neutron emitter and/or a detector. Such non-radioisotope-based neutron devices may be utilized for a variety of purposes and/or applications including non-destructive evaluation ("NDE"), such as for oil-well inspection, bore-hole/well logging, or military applications.

BACKGROUND

The development of non-radioisotope-based sources of neutrons and/or radiation (e.g., x-rays, gamma rays) is an important part of the national effort to reduce reliance on radioisotopes, advance nuclear non-proliferation, and address waste concerns. Radioisotope sources, such Americium-Beryllium (AmBe) neutron sources that are frequently used to conduct neutron well-logging tests, may also pose a security risk. Non-radioisotope sources of neutrons and/or radiation (e.g., x-rays, gamma rays) are thus of great interest. However, progress in this area has been slow due to a lack of comparable replacements.

There has been substantial effort in development of non-radioisotope neutron and/or radiation devices for a wide range of applications. These non-radioisotope neutron and/or radiation devices typically involve bombarding a material with electrons, protons, and/or ions. The interaction of the electrons, protons, and/or ions with the material results in the production and/or emission of neutrons and/or radiation (e.g., x-rays, gamma rays) that may be used in place of neutrons and/or radiation from radioisotope sources. Such non-radioisotope neutron and/or radiation devices may be convenient to use and can produce neutrons and/or high energy x-rays and gamma rays to, for example, irradiate medical wastes, sterilize food items, and interrogate oil-well integrity.

Compact non-radioisotope neutron devices have seen considerable development, initially as triggers for weapons. Existing neutron devices (e.g., neutron tubes) typically use deuterium (D-D) reactions and/or tritium (D-T) reactions to produce and/or emit neutrons, and may utilize a deuterium ionizer and one or more targets that can have a variety of configurations. However, some neutron devices may not be able to effectively and/or efficiently meet the needs for various applications, which often require a neutron device that is capable of enduring harsh environments such as high temperatures, high pressures, liquid environments, and/or restricted geometries/operational space for example.

Accordingly, there is a need for an innovative and improved non-radioisotope-based neutron device, neutron emitter, and/or detector that minimizes or eliminates one or more challenges or shortcomings of existing non-radioisotope-based neutron devices, neutron emitters, and/or detectors.

SUMMARY

A neutron device may include a neutron emitter. The neutron emitter may include a target, an electron source, and a vacuum space in which ionization gas is disposed. The electron source may be configured to emit electrons toward the target when a voltage is applied between the target and the electron source. The vacuum space may be disposed between the target and the electron source. Reaction ions may be released when the electrons interact with the ionization gas. Neutrons may be emitted from the target when the reaction ions contact the target.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
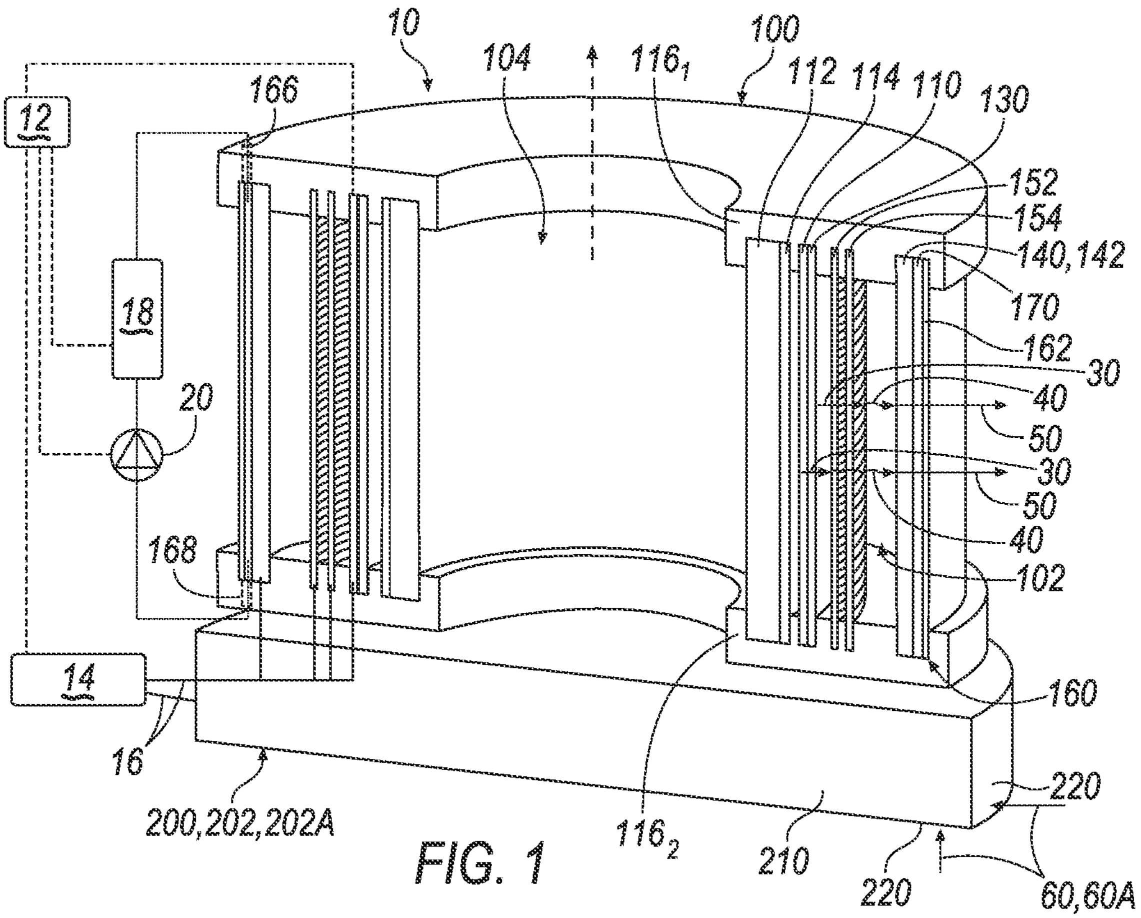
FIG. 1 is a cross-sectional perspective view of an exemplary neutron device configured to emit electrons in a radially outward direction.

Referring to FIG. 1, a neutron device 10 includes a controller 12, a power source 14 (e.g., a battery), a neutron emitter 100 that emits neutrons 50, and one or more detectors 200 that detects and/or measures emissions (e.g., neutrons 50, 60A and/or gamma-rays 60B). The neutron emitter 100 includes a low-pressure or vacuum space 102, one or more covers 116, an electron source 130 that emits electrons 30, a target 140, and a plurality of grids 152, 154. Optionally, the neutron emitter 100 includes a plurality of shells (e.g., a first shell 110, a second shell 112), a plurality of permanent magnets 114, a heat exchanger 18, a pump 20, and a cooling jacket 160. The controller 12 is operatively (e.g., communicatively, electrically, and/or physically) connected to the power source 14, the neutron emitter 100 (e.g., the electron source 130), the detector(s) 200, the heat exchanger 18, and the pump 20. The controller 12 is configured to control and/or operate the power source 14, the neutron emitter 100 (e.g., the electron source 130), the detector(s) 200, the heat exchanger 18, the pump 20, and/or the neutron device 10 as a whole. The power source 14 is physically and electrically connected to the neutron emitter 100 (e.g., the electron source 130, the target 140, and the plurality of grids 152, 154) and to the detector(s) 200, such as by one or more conductors 16. The power source 14 is configured to provide power and/or electricity to the electron source 130 and the target 140 to establish a voltage differential therebetween. The power source 14 is configured to provide power and/or electricity to the plurality of grids 152, 154 to establish and/or generate one or more electric fields that influence the electrons 30 emitted by the electron source 130. The power source 14 is configured to provide power and/or electricity to the detector(s) 200 to power the detector(s) 200.

The electron source 130, which may be commonly known and/or referred to as a cathode, is configured to emit electrons 30. The target 140, which may be commonly known and/or referred to as an anode, is configured to emit neutrons 50 when subjected to (e.g., contacted, impinged, and/or bombarded by) certain types of ions, which are referred to as reaction ions 40 herein. During operation, electrons 30 are emitted from the electron source 130 (i.e., the cathode) and directed across the vacuum space 102 toward the target 140 (i.e., the anode) due to a voltage differential provided and/or established between the electron source 130 and the target 140 by the power source 14. The electrons 30 interact with (e.g., strike molecules of) ionization gas within the vacuum space 102, which generates and/or results in the release of reaction ions 40. The reaction ions 40 are accelerated across the vacuum space 102 toward the target 140 due to the voltage differential between the electron source 130 and the target 140. The electrons 30 and/or the reaction ions 40 are accelerated across the vacuum space 50 with a voltage of approximately 100 keV in some examples. The reaction ions 40 contact, impact, and/or impinge on the target 140 and interact (e.g., react) with one or more reaction materials of the target 140, resulting in the release, generation, and/or emission of neutrons 50 from the target 140 at the point of impact. These neutrons 50 are emitted from the neutron emitter 100 and interact with one or more nearby objects and/or formations 70. The detector(s) 200 then detects and/or measures emissions, such as (i) the emitted neutrons 50 that have passed through the nearby object and/or formation 70 and/or (ii) scattered and/or secondary emissions 60 (e.g., neutrons 60A and/or gamma-rays 60B) resulting from interaction of the emitted neutrons 50 and the object 70. The neutron device 10 can generally be utilized as desired in this manner, such as for non-destructive evaluation (e.g., oil-well inspection, borehole/well logging, military applications) and/or other commonly known uses. In downhole applications (e.g., oil-well inspection, borehole/well logging), for example, the emitted neutrons 50 interact with the casing and surrounding strata to produce secondary emissions 60 (e.g., neutrons 60A, x-rays, gamma-rays 60B) that are measured by the detector(s) 200 as a wireline tool is pulled up the hole and/or well, which enables the neutron device 10 to map the geometry of the hole and/or well.

As generally illustrated in FIGS. 1-4, the first shell 110 is a body (e.g., a metallic body) that supports the electron source 130 (e.g., the electron emitters thereof). The first shell 110 may also provide structural support to the neutron emitter 100 as a whole. The first shell 110 may have a variety of shapes depending on the configuration of the neutron emitter 100, such as a cylindrical shape (e.g., FIGS. 1-3B), a disc shape (e.g., FIG. 4), and/or other suitable shapes. The first shell 110 is disposed between the electron source 130 and the permanent magnets 114 (e.g., radially in FIGS. 1-3B; axially in FIG. 4). In some examples, such as the one depicted in FIG. 5, the neutron emitter 100 does not include a first shell 110.

As generally illustrated in FIGS. 1-4, the second shell 112 is a body (e.g., a metallic body) that supports the permanent magnets 114. The second shell 112 may also provide structural support to the neutron emitter 100 as a whole. The second shell 112 optionally includes a plurality of receptacles that each receive a respective permanent magnet 114. The receptacles are each sized and shaped in complimentary manner (e.g., as a negative of) their respective permanent magnet 114. The second shell 112 is composed at least partially of aluminum, but may be composed of and/or include other metals and/or materials. The second shell 112 may have a variety of shapes depending on the configuration of the neutron emitter 100, such as a cylindrical shape (e.g., FIGS. 1-3B), a disc shape (e.g., FIG. 4), and/or other suitable shapes. The second shell 112 and the first shell 110 are disposed on opposite sides (e.g., radial sides in FIGS. 1-3B; axial sides in FIG. 4) of the permanent magnets 114. In some examples, such as the one depicted in FIG. 5, the neutron emitter 100 does not include a second shell 112.

The neutron emitter 100 includes one or more covers 116, which are generally illustrated in FIGS. 1, 3A, 3B, and 4. For example, the neutron emitter 100 of FIGS. 1-3B and 5 includes two covers 116 (e.g., a first cover $116_1$ and a second cover $116_2$) while the neutron emitter 100 of FIG. 4 includes a single cover 116. The cover 116 includes and/or is composed at least partially of one or more insulating materials to maintain a voltage differential between the electron source 130 and the target 140. In other words, the cover 116 is a high voltage (HV) insulator and may be referred to as a HV insulator cover 116. The cover 116 may have a variety of shapes depending on the configuration of the neutron emitter 100, such as an annular shape (e.g., FIG. 1), a disc shape (e.g., FIGS. 3A, 3B), a cylindrical shape (e.g., FIG. 4), and/or other suitable shapes.

The electron source 130 is disposed at least partially in the vacuum space 102. The electron source 130 (i.e., the cathode) is configured to emit electrons 30 (e.g., from the electron-emitting surface) through the vacuum space 102 toward the target 140. The electron source 130 is configured to direct and/or focus the emitted electrons 30 toward and/or onto the target 140. In one example, the electron source 130 emits electrons 30 in the form of one or more electron beams. The electron beams are broad-area electron beams as opposed to tightly focused electron beams, though tightly focused electron beams could also be utilized if desired. By using broad-area electron beams, a greater number of electrons 30 are introduced into the vacuum space 102 and/or electrons 30 are introduced into the vacuum space 102 at a higher rate, which increases the generation rate of reaction ions 40 (e.g., due to an increased number and/or frequency of interactions between electrons 30 and ionization gas) and thus increases the generation/emission rate of neutrons 50 and/or the neutron flux of the neutron device 10. The electrons 30 are emitted from the electron source 130 at near-0 energy (e.g. a few electron-volts (or eV) energy). The electrons 30 are accelerated across the vacuum space 102 by the electric field between the electron source 130 and the target 140. The electric field is approximately E=V/d, where E=electric field strength, V=voltage difference between the electron source 130 and the target 140, and d=distance between the electron source 130 and the target 140. The electron source 130 emits electrons 30 that are accelerated to 100 keV (i.e., 100 keV energy electrons), but the emitted electrons 30 may be accelerated to an energy other than 100 keV depending upon the voltage difference between the electron source 130 and the target 140. In one example, the emission current density of the electron source 130 is of order 1 mA/cm$^2$. In other examples, the electron source 30 may have an onset field as low as 0.75 V/μm and/or a current density greater than 5 mA/cm$^2$.

With regard to FIGS. 1-4, the electron source 130 is and/or includes a plurality of electron emitters. The emitters are disposed in the vacuum space 102 and are connected to and/or mounted on the first shell 110. The emitters are typically cold electron emitters (e.g., carbon nanotube emitters, photoemission emitters), which do not experience elevated surface temperatures, to avoid additional heat generation. The utilization of cold electron emitters simplifies the overall design of the neutron device 10, reduces the overall operating temperature of the neutron device 10, improves reliability of the neutron device 10, and reduces the overall number of components (e.g., eliminates additionally cooling components that may be necessary if a 'hot' electron emitter were utilized). In some examples, the electron emitters are carbon nanotube emitters due to their ability to withstand high temperatures and vibrations. Additionally and/or alternatively, the electron source 130 may be and/or include one or more other kind and/or type of emitter such as a photoemission emitter, thermionic emitter, secondary emitter, and/or field emitter. Optionally, subsets and/or individual emitters of the electron source 130 can be controlled independently (e.g., via the controller 12) to enable different and/or optimal dose patterns to be achieved by utilizing/operating only select emitters during operation of the neutron device 10.

Figure 5:
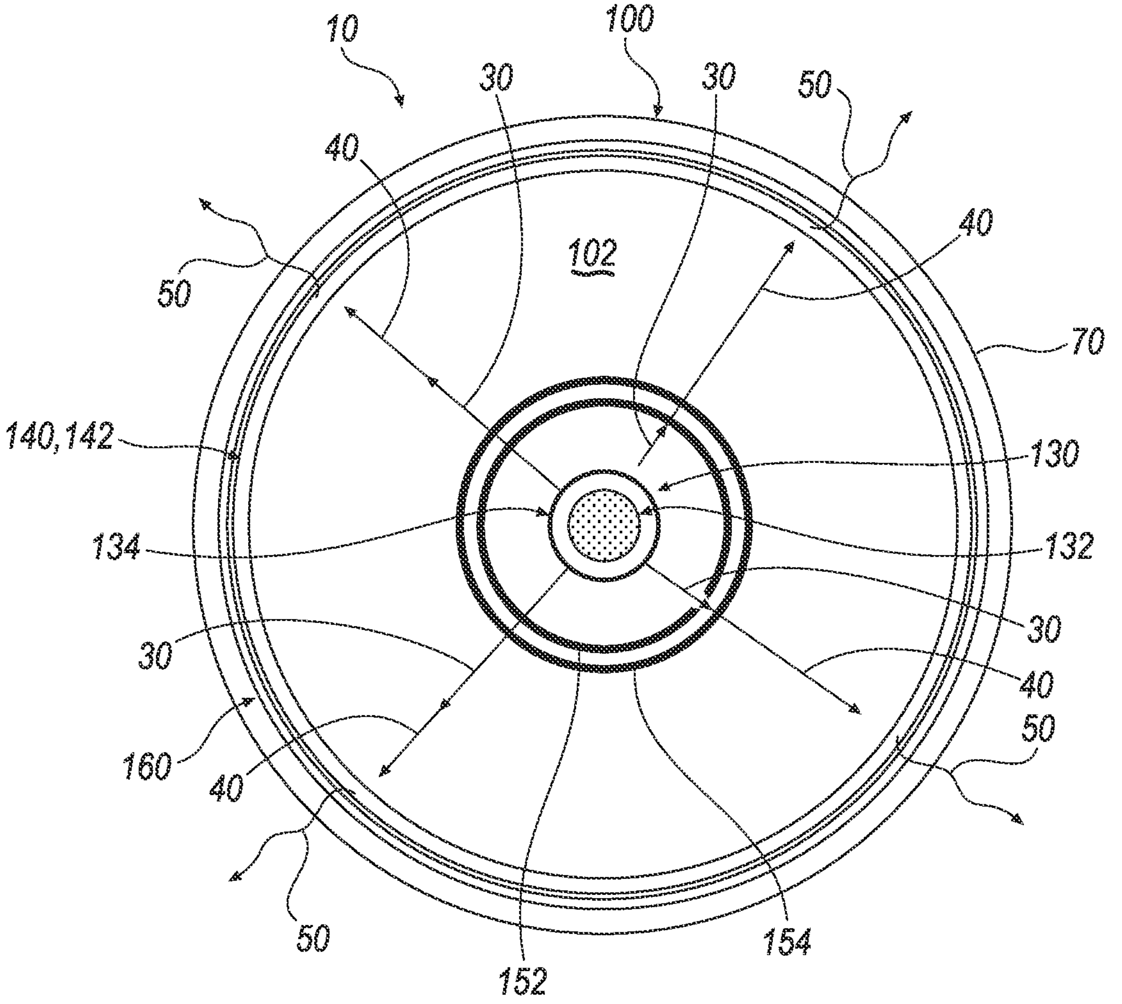
FIG. 5 is a cross-sectional view of a portion of an exemplary neutron device including an electron source configured as a thermionic emitter.

With regard to FIG. 5, the electron source 130 is a thermionic emitter including a rod 132 and a coil 134 (e.g., a filament). The rod 132 is composed of a rod material (e.g., palladium and/or nickel) and is doped with the reaction material (e.g., deuterium). The coil 134 (e.g., a tungsten coil) is helically wound around the rod 132. The coil 134 is electrically connected to the power source 14, which provides electricity and/or electrical current to the coil 134 causing the coil 134 to heat up and to emit electrons 30.

As generally illustrated in FIGS. 1-4, permanent magnets 114 are disposed and/or mounted on and connected to the second shell 112. The magnets 114 are arranged in an array on the second shell 112, but may be arranged in other suitable and/or desirable patterns and/or manners. The magnets 114 and/or the second shell 112 are disposed adjacent to and spaced apart from the electron source 130 and/or the first shell 110. The second shell 112 and the first shell 110 are disposed on opposite sides of the magnets 114 (i.e., the magnets 114 are disposed between the first shell 110 and the second shell 112). The magnets 114 and the electron source 130 are disposed on opposite sides of the first shell 110 (i.e., the first shell 110 is disposed between the magnets 114 and the electron source 130). In some examples, such as the one depicted in FIG. 5, the neutron emitter 100 does not include permanent magnets 114.

The magnets 114 are configured to emit and/or provide one or more magnetic fields that influence the electrons 30 emitted by the electron source 130. For example, the magnets 114 are configured to emit and/or provide magnetic fields that elongate and/or increase the length of the path that the electrons 30 travel through the vacuum space 102. This in turn increases the number of interactions between the electrons 30 and the ionization gas, which results in the release and/or production of a greater amount of reaction ions 40. The greater amount of reaction ions 40 leads to a larger number of reactions between reaction ions 40 and reaction material of the target 140 and, thus, the generation and/or emission of a greater amount of neutrons 50. As such, the magnets 114 effectively increase the efficiency of the neutron device 10, the neutron production/emission rate (e.g., neutrons 50 produced/emitted per second) of the neutron device 10, and/or the neutron flux (e.g., neutrons 50/cm2/sec) of the neutron device 10.

The plurality of grids 152, 154 includes a biased grid 152 and a secondary grid 154. The biased grid 152 is configured to alter and/or set the strength of the electric field in the region directly adjacent to the electron source 130 to maximize the emission current density. The secondary grid 154 is configured to slow down and/or reduce the speed of the electrons 30 to increase the probability of the electrons 30 interacting with the ionization gas (e.g., to increase the amount and/or rate of reaction ion 40 production/generation). The grids 152, 154 may have a variety of shapes depending on the configuration of the neutron emitter 100, such as a cylindrical shape (e.g., FIGS. 1-3B and 5), a disc shape (e.g., FIG. 4), and/or other suitable shapes. The biased grid 152 is disposed in the vacuum space 102 and is arranged between and spaced apart from the electron source 130 and the secondary grid 154. The secondary grid 154 is disposed in the vacuum space 102 and is arranged between and spaced apart from the biased grid 152 and the target 140.

The target 140 (i.e., the anode) is configured to emit neutrons 50 when subjected to (e.g., contacted, impacted impinged on, and/or bombarded by) certain types of ions (i.e., reaction ions 40). The target 140 is disposed between (e.g., radially in FIGS. 1-3B; axially in FIG. 4) the electron source 130 and the cooling jacket 160. The target 140 is contacted to and/or in contact with the cooling jacket 160 such that the cooling jacket 160 cools the target 140. In examples, the target 140 at least partially defines the fluid chamber 170 of the cooling jacket 160 (e.g., FIGS. 1, 3A-4) or does not at least partially define the fluid chamber 170 (e.g., FIGS. 2A, 2B).

The target 140 includes one or more base bodies 142 composed of a base material. The base body 142 is a single monolithic base body 142 in some examples (e.g., FIGS. 1, 3A-5), or a plurality of separate base bodies $\mathbf{142}_1$-$\mathbf{142}_7$ in other examples (e.g., FIGS. 2A, 2B). The target 140 and/or the base body/bodies 142 may have a variety of shapes depending on the configuration of the neutron emitter 100, such as a cylindrical shape (e.g., FIGS. 1, 3A, 3B, 5), an annular shape (e.g., FIG. 2A, 2B), a disc shape (e.g., FIG. 4), and/or other suitable shapes. Additionally, the thickness of the target 140 and/or the base body/bodies 142 influences neutron production efficiency.

The base material of the base body/bodies 142 is and/or includes titanium, but may be and/or include one or more other elements and/or materials in other examples. The base body/bodies 142 is doped with one or more reaction materials that interact (e.g., react) with the reaction ions 40 to release, emit, and/or provide neutrons 50. In examples, the reaction material is and/or includes deuterium. In other examples, the reaction material is and/or includes tritium. In further examples, the reaction material is and/or includes both (e.g., a combination and/or mixture of) deuterium and tritium. Tritium is more efficient than deuterium with respect to neutron emission, but is also radioactive. Conversely, deuterium is non-radioactive, but is less efficient with respect to neutron emission than tritium. Therefore, deuterium, tritium, or a combination of the two may be desirable based on the situation and the primary intended use of the neutron device 10.

Optionally, the target 140 includes a layer 144 of the reaction material (e.g., deuterium and/or tritium), which may also be referred to as a reaction material layer 144, that provides additional ionization gas gettering. The reaction material layer 144 is disposed on a surface of the base body/bodies 142 facing the electron source 130 (see, e.g., FIG. 3B). The reaction material layer 144 is formed and/or deposited on the surface of the base body/bodies 142 during manufacturing of the neutron device 10 in some examples. In other examples, the target 140 may not include the reaction material layer 144, at least initially. However, one or more materials and/or elements present in the ionization gas (e.g., one or more ionization materials, such as deuterium and/or tritium) may be deposited on, stick to, and/or collect on the surface of the target 140 naturally during operation of the neutron device 10 resulting in the formation of a reaction material layer 144 and/or additional or new layers of reaction material.

At least a portion of the vacuum space 102 is disposed between and separates the electron source 130 and the target 140. A dimension of the vacuum space 102 (i.e., the distance between the electron source 130 and the target 140) may vary based on the voltage differential therebetween. The dimension of the vacuum space 102 may, for example, range from as little as 4 mm up to a few centimeters. The vacuum space 102 is sealed and is maintained without active pumping, which facilitates use of the neutron device 10 in the field (e.g., since the neutron device 10 is more portable). Additionally and/or alternatively, the neutron device 10 and/or the neutron emitter 100 may include and/or may be connectable to one or more vacuum pumps (e.g., a solid-state pump, such as a non-evaporable getter or "NEG" pump) to establish and/or maintain the vacuum within the vacuum space 102.

The vacuum space 102 includes ionization gas, and/or ionization gas is disposed and/or contained in the vacuum space 102. The ionization gas includes and/or is composed at least partially of one or more ionization materials that release reaction ions 40 upon interacting (e.g., colliding) with electrons 30. In examples, the ionization gas includes and/or is composed at least partially of deuterium (i.e., the ionization gas is deuterium gas and the ionization material is deuterium), and the reaction ions 40 are deuterium ions ($D^+$).

The cooling jacket 160 conducts cooling fluid and/or coolant to cool the target 140. Due to inefficiencies of the neutron production process, at least some heat is generated at the target 140 during operation. This heat is conducted from the target 140 and dissipated by the cooling jacket 160 and the coolant flowing therethrough.

The cooling jacket 160 includes one or more jacket shells 162, a plurality of support members 164, an inlet 166, and an outlet 168. The cooling jacket 160 is connected to the target 140 and at least partially defines a fluid chamber 170 through which a coolant is flowable. The cooling jacket 160, by way of the inlet 166 and outlet 168, is connected to and in fluid communication with the heat exchanger 18 and the pump 20 forming a cooling circuit. Coolant is flowed and/or pumped through the fluid chamber 170 and the heat exchanger 18 by the pump 20 to actively cool the target 140. During operation of the neutron device 10, hot and/or heated coolant that has absorbed heat from the target 140 is discharged from the fluid chamber 170 via the outlet 168, flows to and through the heat exchanger 18 where it is cooled, and is pumped back to and into the fluid chamber 170 via the inlet 166.

The jacket shell 162 is a body (e.g., a metallic body) that at least partially defines the fluid chamber 170. The jacket shell 162 may also provide structural support to the neutron emitter 100 as a whole. The jacket shell 162 is composed at least partially of aluminum, but may be composed of and/or include other metals and/or materials. The jacket shell 162 may have a variety of shapes depending on the configuration of the neutron emitter 100, such as a cylindrical shape (e.g., FIGS. 1-4B), a disc shape (e.g., FIG. 5), and/or other suitable shapes.

The support members 164 are disposed in the fluid chamber 170. The support members 164 are connected to and extend between and connect the jacket shell 162 and the target 140 (e.g., FIGS. 1, 3A-4). Alternatively, the support members 164 are connected to and extend between and connect two jacket shells 162 (e.g., first jacket shell $162_1$ and second jacket shell $162_2$ in FIG. 2A, 2B). The support members 164 reinforce the jacket shell 162 and/or resist deformation of the jacket shell 162 to mitigate and/or prevent collapse of the fluid chamber 170. At least some of the support members 164 are elongated walls and/or projections, and divide and/or separate the fluid chamber 170 into a plurality of fluid channels and/or regions. Additionally and/or alternatively, at least some of the support members 164 may be structured as turbulators, protrusions, and/or pillars that are distributed throughout the fluid chamber 170 to increase turbulence and/or mixing of the coolant in the fluid chamber 170, which increases heat transfer efficiency and thus improves cooling of the target 140.

The neutron device 10 includes one or more detectors 200 configured to receive and/or detect emissions (e.g., neutrons 50, 60A and/or gamma-rays 60B). The neutron device 10 includes a single detector 200 (e.g., FIGS. 1-2B) in some examples, while in other examples the neutron device 10 includes a plurality of detectors 200 (e.g., FIGS. 7-9). The neutron device 10 can be considered to fall within the broad class of neutron tools referred to as neutron-neutron (NN) neutron tools when it includes a detector 200 configured to detect neutrons (i.e., a neutron detector 202). Additionally and/or alternatively, the neutron device 10 can be considered to fall within the broad class of neutron tools referred to as neutron-gamma (NG) neutron tools when it includes a detector 200 configured to detect gamma-rays (i.e., a gamma detector 204).

Figure 2A:
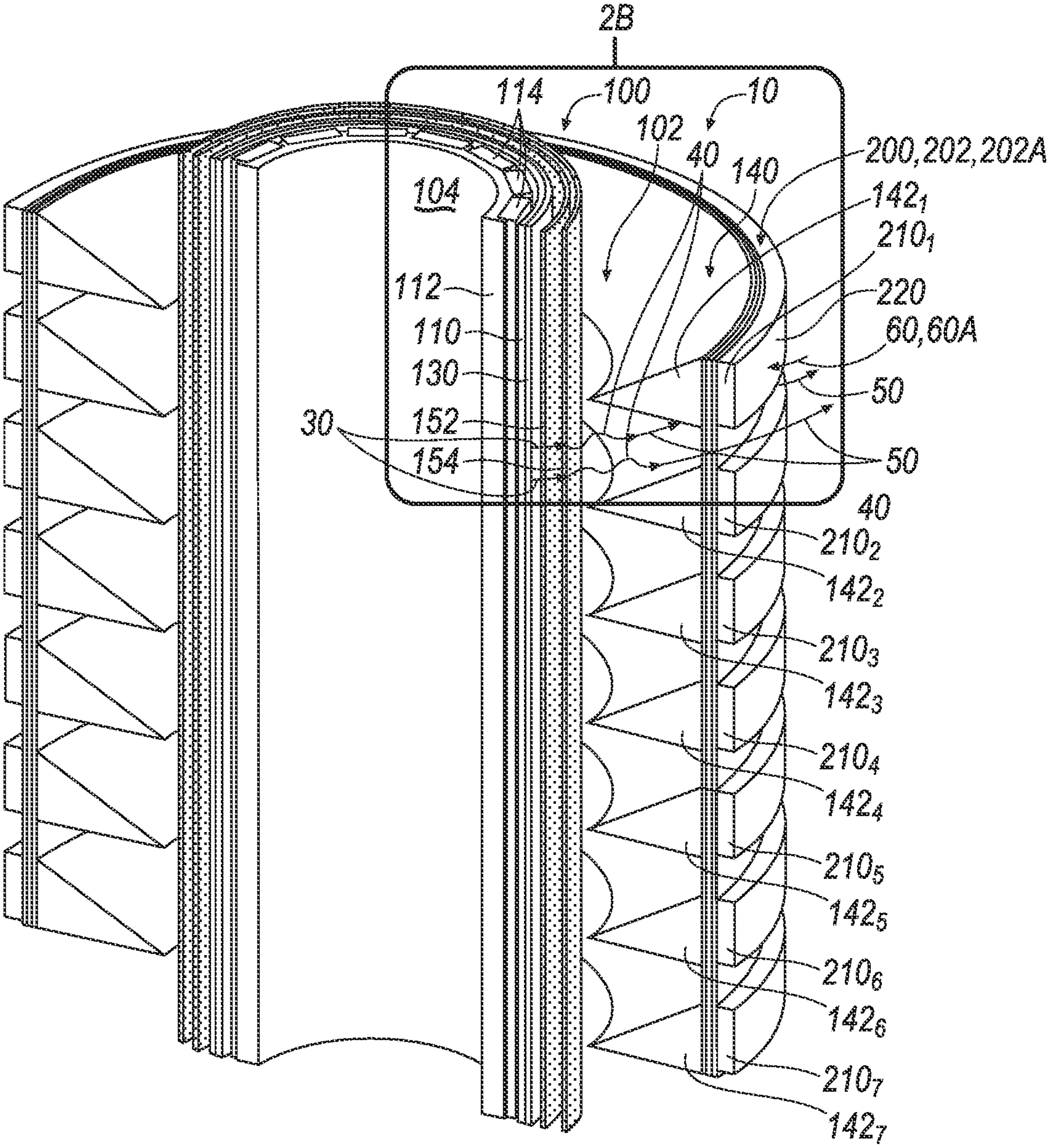
FIG. 2A is a cross-sectional perspective view of an exemplary neutron device including a detector with a plurality of annular segments.

The detector 200 includes a single portion/body 210 in some examples (e.g., FIG. 1), or a plurality of separate portions/segments/bodies 210 in other examples (e.g., annular segments $210_1$-$210_7$ in FIG. 2A). The detector 200 and/or one or more portions 210 thereof may have a variety of shapes depending on the configuration of the neutron emitter 100, such as a disc shape (e.g., FIG. 1), an annular shape (e.g., FIG. 2A, 2B), and/or other suitable shapes. The detector 200 is disposed on and/or attached to the neutron emitter 100, such as at an axial end of the neutron emitter 100 (e.g., FIG. 1) and/or an outer circumference of the neutron emitter 100 (e.g., FIG. 2A, 2B). Additionally and/or alternatively, the detector 200 is not connected directly to and/or fixed to the neutron emitter 100 and is movable and/or positionable independently of the neutron emitter 100 (see, e.g., FIGS. 7-9).

The neutron device 10 may include a reflection-mode detector 200A and/or a transmission-mode detector 200B. The reflection-mode detector 200A (e.g., FIGS. 1, 2A, 2B, and 7-9) receives and/or detects scattered and/or secondary emissions 60 (e.g., neutrons 60A and/or gamma-rays 60B) that occur when the neutrons 50 emitted by the neutron device 10 interact with the object(s) and/or formation(s) 70. These secondary emissions 60 may also commonly known and/or referred to as 'return emissions'. As such, the reflection-mode detector 200A and the neutron emitter 100 are typically arranged on the same side of the object(s) and/or formation(s) 70 being inspected (e.g., a well casing, cement, etc.). The transmission-mode detector 200B (e.g., FIGS. 7-9) receives and/or detects the neutrons 50 emitted by the neutron device 10 that have passed through the object(s) and/or formation(s) 70 being inspected. As such, the transmission-mode detector 200B and the neutron emitter 100 are typically arranged on opposite sides of the object(s) and/or formation(s) 70 being inspected.

The detector 200 is a gadolinium-based detector, though other types of detectors 200 are also suitable. The detector 200 includes one or more detection panels 220 disposed at an outer perimeter of the detector 200 (e.g., at an axial end and/or around an outer circumference). The detection panel 220 includes at least one collector plate 222, at least one microchannel plate 224, a gadolinium layer 226, and a support body 228. The gadolinium layer 226 includes $^{157}Gd$ as a converter and has a thickness of 1 μm. The detector 200 includes one or more detection panels 220 configured as shown in FIG. 6A and/or one or more detection panels 220 configured as shown in FIG. 6B.

Figure 6A:
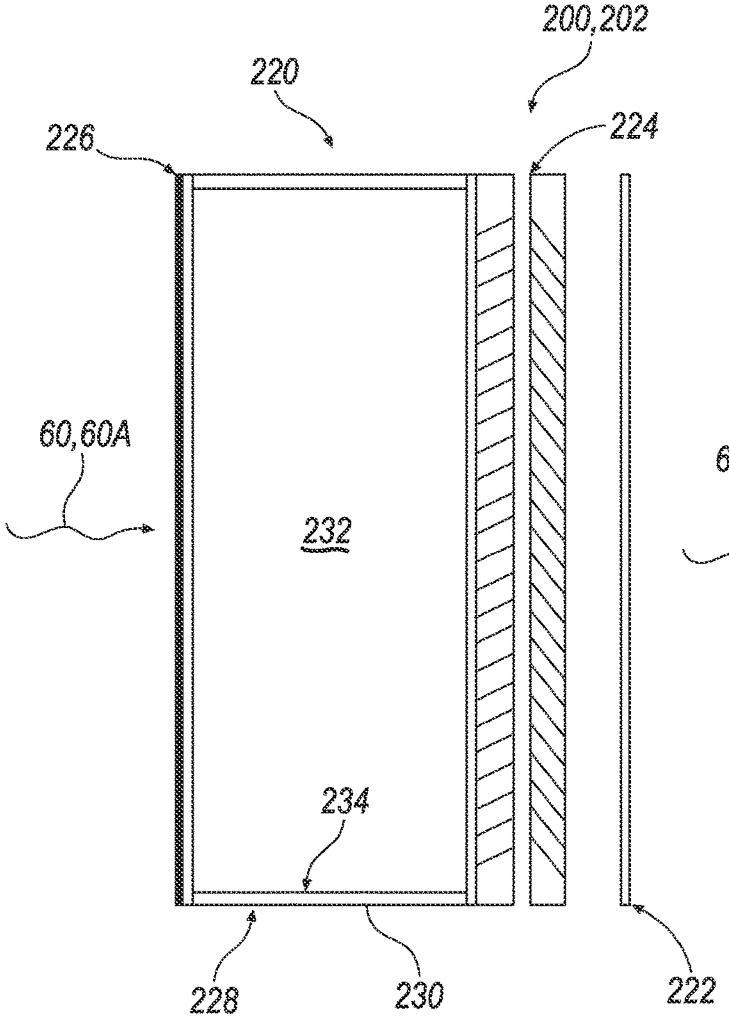
FIG. 6A is a cross-sectional view of an exemplary detection panel based on photon decay.

In FIG. 6A, the detection panel 220 is based on photon decay. The support body 228 is a glass vessel 230 containing sodium iodide (NaI) 232. The glass vessel 230 includes a reflector and/or a reflector layer 234. The gadolinium layer 226 is disposed on and/or attached to a first surface and/or side of the support body 228 and/or glass vessel 230 facing in a direction from which neutrons 50, 6A are to be received by the detector 200 (e.g., away from the neutron emitter 100, opposite the direction in which the neutrons 50, 60A are expected to travel). The microchannel plate 224 is disposed on and/or attached to a second surface and/or side of the support body 228 and/or glass vessel 230, which is disposed opposite of and/or faces away from the first surface and/or side. The collector plate 222 is disposed on and/or attached to a surface and/or side of the microchannel plate 224 opposite the glass vessel 230.

Figure 6B:
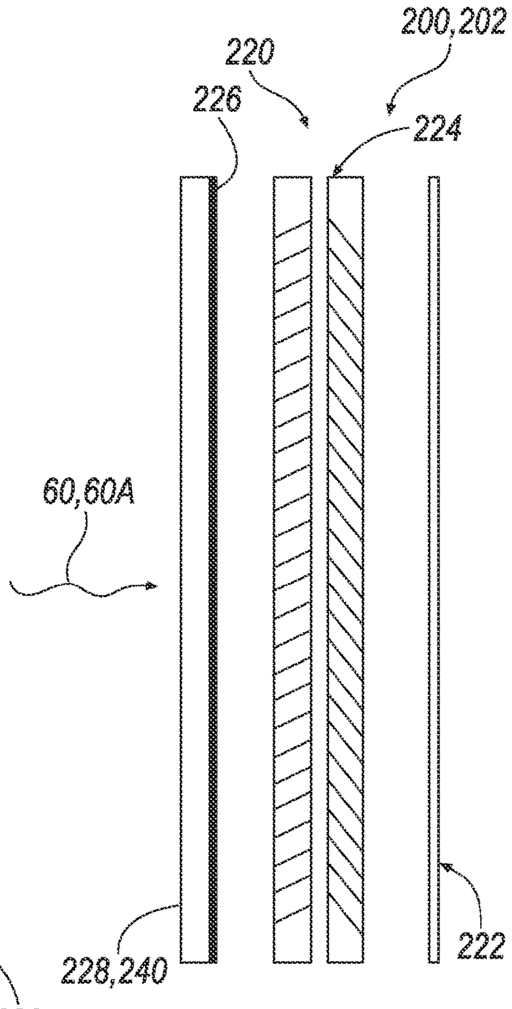
FIG. 6B is a cross-sectional view of an exemplary detection panel that is an internal electron conversion detector.

In FIG. 6B, the detection panel 220 is an internal electron conversion detector 200. The support body 228 is a silicon body 240 having a thickness of 200 μm. The gadolinium layer 226 is disposed on and/or attached to a surface and/or side of the silicon body 240 facing the microchannel plate 224. The microchannel plate 224 is disposed on and/or attached to a surface and/or side of the gadolinium layer 226 opposite the silicon body 240. The collector plate 222 is disposed on and/or attached to a surface and/or side of the microchannel plate 224 opposite the gadolinium layer 226.

The neutron device 10 illustrated in FIG. 1 includes a neutron emitter 100 configured to emit electrons 30 in a radially outward direction. In this configuration of the neutron emitter 100, the shells 110, 112, the electron source 130, the grids 152, 154, the target 140, and the cooling jacket 160 are cylindrical and extend axially between the covers 116$_1$, 116$_2$, which are annular shaped. The second shell 112 defines an internal cavity 104 of the neutron emitter 100. The plurality of permanent magnets 114 are disposed on and/or project from an outer circumferential surface of the second shell 112 that faces radially outward. The second shell 112 and the magnets 114 are disposed in (e.g., radially inward of) and circumferentially surrounded by the first shell 110 and the electron source 130. The electron source 130 is disposed on and connected to an outer circumferential surface of the first shell 110 that faces radially outward. The electron source 130 (e.g., the emitters thereof) is structured and arranged to emit electrons 30 and/or electron beams in a generally radially outward direction and/or toward the target 140. The biased grid 152 is disposed outside of (e.g., radially outward of) and circumferentially surrounds the first shell 110 and the electron source 130. The secondary grid 154 is disposed outside of (e.g., radially outward of) and circumferentially surrounds the biased grid 152. The target 140 is disposed outside of (e.g., radially outward of) and circumferentially surrounds the secondary grid 154. The cooling jacket 160 (e.g., the jacket shell 162) is disposed on and connected to an outer circumferential surface of the target 140 that faces radially outward, and the cooling jacket 160 circumferentially surrounds the target 140. The fluid chamber 170 is (i) defined radially by and between the target 140 and the jacket shell 162 and (ii) defined axially by and between the covers 116$_1$, 116$_2$. The vacuum space 102 is annular and is defined (i) radially by and between the first shell 110 and the target 140 and (ii) axially by and between the covers 116$_1$, 116$_2$. The detector 200 is generally disc shaped and is disposed at an axial end of the neutron emitter 100. The detector 200 is attached and/or connected to the second cover 116$_2$. Optionally, the neutron device 10 includes a second detector 200 (not shown) that is generally disc shaped, is disposed at the other axial end of the neutron emitter 100, and is attached and/or connected to the first cover 116$_1$.

During operation of the neutron device 10 illustrated in FIG. 1, the electrons 30 (e.g., emitted by the electron source 130) and the reaction ions 40 within the vacuum space 102 are accelerated across the vacuum space 102 in a radially outward direction toward the target 140 due to the voltage differential between the electron source 130 and the target 140. At least some of the neutrons 50 generated and/or emitted by the target 140 are directed radially outward. The neutrons 50 pass through the target 140, the cooling jacket 160 (e.g., the jacket shell 162 and potentially one or more support members 164), and the coolant flowing through the fluid chamber 170 prior to reaching the desired object 70 for inspection. The speed of the emitted neutrons 50 decreases as the neutrons 50 pass through the coolant, which has been found to be an effective neutron moderator.

Figure 2B:
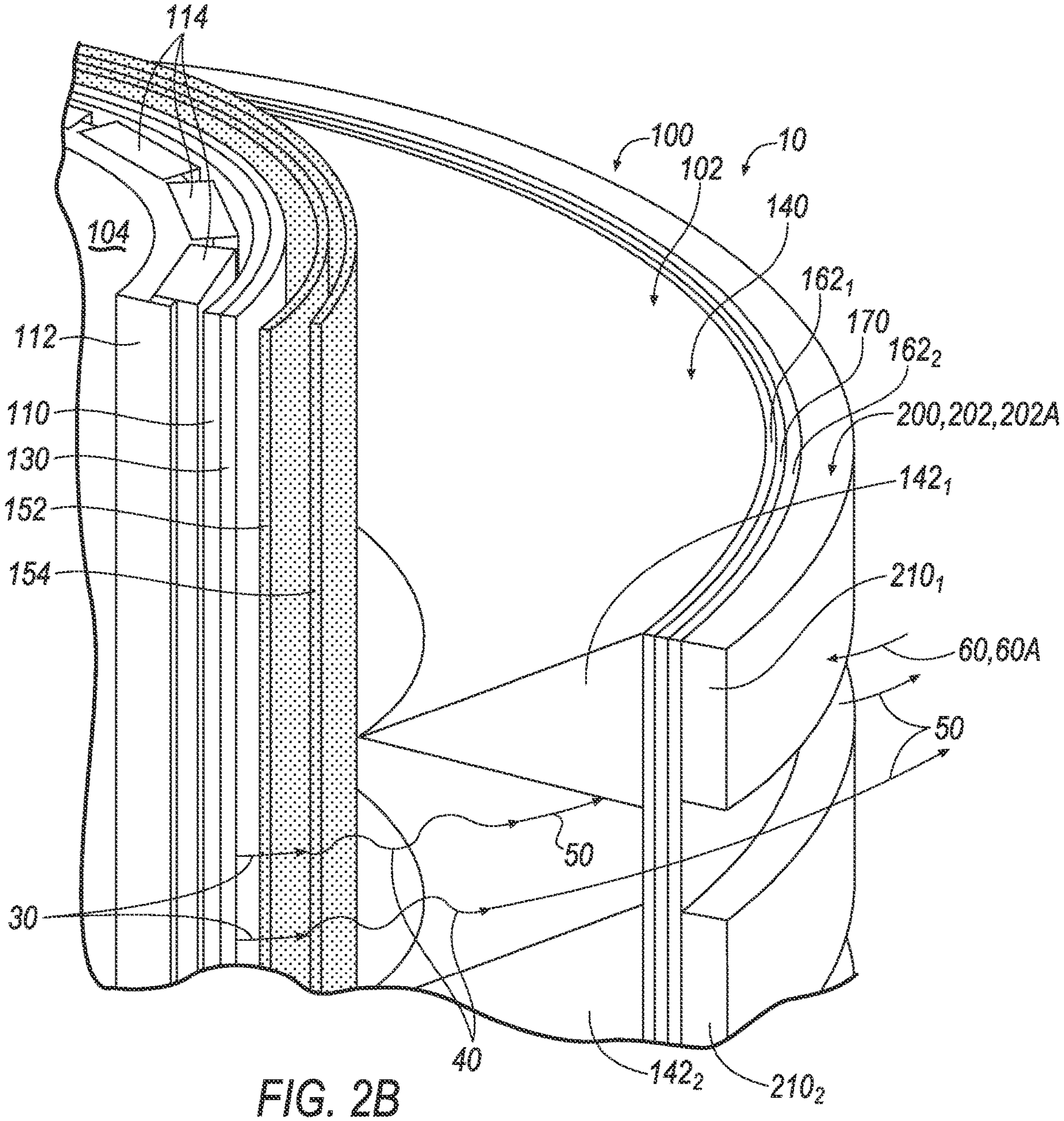
FIG. 2B is a close up of a portion of the neutron device of FIG. 2A.

The neutron device 10 illustrated in FIGS. 2A and 2B includes a neutron emitter 100 configured to emit electrons 30 in a radially outward direction. In this configuration of the neutron emitter 100, the shells 110, 112, the electron source 130, the grids 152, 154, and the cooling jacket 160 are cylindrical and extend axially between two disc shaped covers (not shown), which are substantially similar to the covers 116$_1$, 116$_2$ depicted in FIG. 1. The second shell 112 defines an internal cavity 104 of the neutron emitter 100. The plurality of permanent magnets 114 are disposed on and/or project from an outer circumferential surface of the second shell 112 that faces radially outward. The second shell 112 and the magnets 114 are disposed in (e.g., radially inward of) and circumferentially surrounded by the first shell 110 and the electron source 130. The electron source 130 is disposed on and connected to an outer circumferential surface of the first shell 110 that faces radially outward. The electron source 130 (e.g., the emitters thereof) is structured and arranged to emit electrons 30 and/or electron beams in a generally radially outward direction and/or toward the target 140. The biased grid 152 is disposed outside of (e.g., radially outward of) and circumferentially surrounds the first shell 110 and the electron source 130. The secondary grid 154 is disposed outside of (e.g., radially outward of) and circumferentially surrounds the biased grid 152. The target 140 is disposed outside of (e.g., radially outward of) and circumferentially surrounds the secondary grid 154. The target 140 includes a plurality of separate annular base bodies $142_1$-$142_7$ that have a generally triangular and/or wedge-shaped cross-section. The annular base bodies $142_1$-$142_7$ are specifically designed such that neutrons 50 emitted from the target 140 are not received by the detector 200. The annular base bodies $142_1$-$142_7$ are arranged coaxially and are axially spaced apart from one another. The annular base bodies $142_1$-$142_7$ are connected to and/or mounted on an inner circumferential surface of a radially inner jacket shell $162_1$ of the cooling jacket 160. A radially outer jacket shell $162_2$ of the cooling jacket 160 is disposed outside of (e.g., radially outward of) and circumferentially surrounds the inner jacket shell $162_1$. The fluid chamber 170 is (i) defined radially by and between the jacket shells $162_1$, $162_2$ and (ii) defined axially by and between the covers. The vacuum space 102 is annular and is defined (i) radially by and between the first shell 110 and the inner jacket shell $162_1$ and (ii) axially by and between the covers. The detector 200 is disposed outside of (e.g., radially outward of) and circumferentially surrounds the neutron emitter 100. The detector 200 includes a plurality of annular segments $210_1$-$210_7$ disposed outside of (e.g., radially outward of) and circumferentially surrounding the outer jacket shell $162_2$. The annular segments $210_1$-$210_7$ are arranged coaxially and are axially spaced apart from one another. The annular segments $210_1$-$210_7$ are each arranged in alignment with a respective base body $142_1$-$142_7$ of the target 140. Due to the multi-piece annular configuration of the target 140 and detector 200, the output of the neutron device 10 of FIGS. 2A and 2B has an improved and/or higher resolution (e.g., relative to the neutron device 10 of FIG. 1 with a monolithic cylindrical target 140 and a disc-shaped detector 200).

During operation of the neutron device 10 illustrated in FIGS. 2A and 2B, the electrons 30 (e.g., emitted by the electron source 130) and the reaction ions 40 within the vacuum space 102 are accelerated across the vacuum space 102 in a radially outward direction toward the target 140 due to the voltage differential between the electron source 130 and the target 140. At least some of the neutrons 50 generated and/or emitted by the target 140 are directed radially outward and pass through the axial gaps between axially adjacent annular base bodies $142_1$-$142_7$ of the target 140 and the axial gaps between axially adjacent annular segments $210_1$-$210_7$ of the detector 200. The neutrons 50 pass through the cooling jacket 160 (e.g., the jacket shells $162_1$, $162_2$ and potentially one or more support members 164) and the coolant flowing through the fluid chamber 170 prior to reaching the desired object 70 for inspection. The speed of the emitted neutrons 50 decreases as the neutrons 50 pass through the coolant, which has been found to be an effective neutron moderator.

Figure 3A:
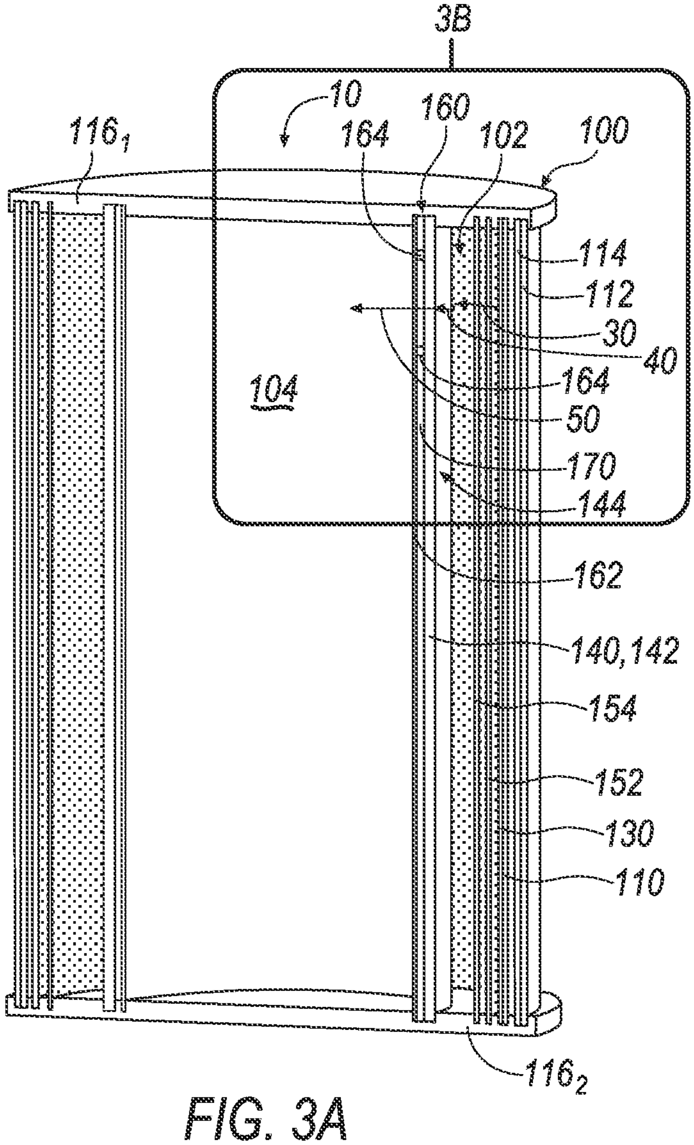
FIG. 3A is a cross-sectional perspective view of an exemplary neutron device configured to emit electrons in a radially inward direction.
Figure 3B:
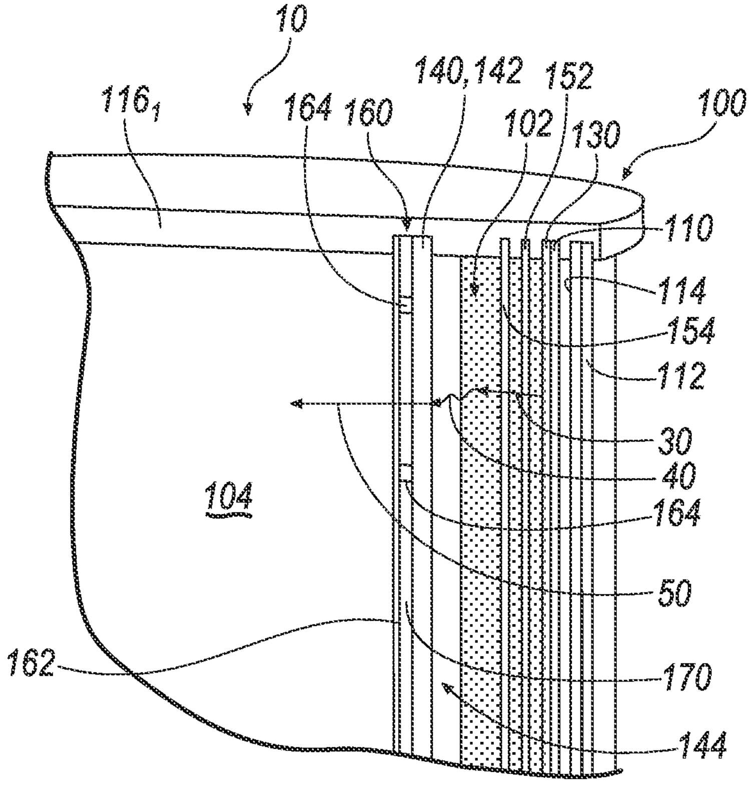
FIG. 3B is a close up of a portion of the neutron device of FIG. 3A.

The neutron device 10 illustrated in FIGS. 3A and 3B includes a neutron emitter 100 configured to emit electrons 30 in a radially inward direction. In this configuration of the neutron emitter 100, the shells 110, 112, the electron source 130, the grids 152, 154, the target 140, and the cooling jacket 160 are cylindrical and extend axially between the covers $116_1$, $116_2$, which are disc shaped. The cooling jacket 160 (e.g., the jacket shell 162) defines an internal cavity 104 of the neutron emitter 100. The cooling jacket 160 (e.g., the jacket shell 162) is disposed on and connected to an inner circumferential surface of the target 140 that faces radially inward, and the target 140 circumferentially surrounds the cooling jacket 160. The fluid chamber 170 is (i) defined radially by and between the target 140 and the jacket shell 162 and (ii) defined axially between the covers $116_1$, $116_2$. The secondary grid 154 is disposed outside of (e.g., radially outward of) and circumferentially surrounds the target 140 and the cooling jacket 160. The biased grid 152 is disposed outside of (e.g., radially outward of) and circumferentially surrounds the secondary grid 154. The first shell 110 and the electron source 130 are disposed outside of (e.g., radially outward of) and circumferentially surround the biased grid 152. The electron source 130 is disposed on and connected to an inner circumferential surface of the first shell 110 that faces radially inward. The electron source 130 (e.g., the emitters thereof) is structured and arranged to emit electrons 30 and/or electron beams in a generally radially inward direction and/or toward the target 140. The second shell 112 and the magnets 114 are disposed outside of (e.g., radially outward of) and circumferentially surround the electron source 130 and the first shell 110. The plurality of permanent magnets 114 are disposed on and/or project from an inner circumferential surface of the second shell 112 that faces radially inward. The vacuum space 102 is annular and is defined (i) radially by and between the first shell 110 and the target 140 and (ii) axially by and between the covers $116_1$, $116_2$. While not depicted, the neutron device 10 includes one or more detectors 200 that is structured and arranged in a substantially similar manner as described above with respect to FIG. 1.

During operation of the neutron device 10 illustrated in FIGS. 3A and 3B, the electrons 30 (e.g., emitted by the electron source 130) and the reaction ions 40 within the vacuum space 102 are accelerated across the vacuum space 102 in a radially inward direction toward the target 140 due to the voltage differential between the electron source 130 and the target 140. At least some of the neutrons 50 generated and/or emitted by the target 140 are directed radially outward. The neutrons 50 pass through the biased grid 152, the secondary grid 154, the electron source 130, the first shell 110, one or more magnets 114, and/or the second shell 112 prior to reaching the desired object 70 for inspection.

Figure 4:
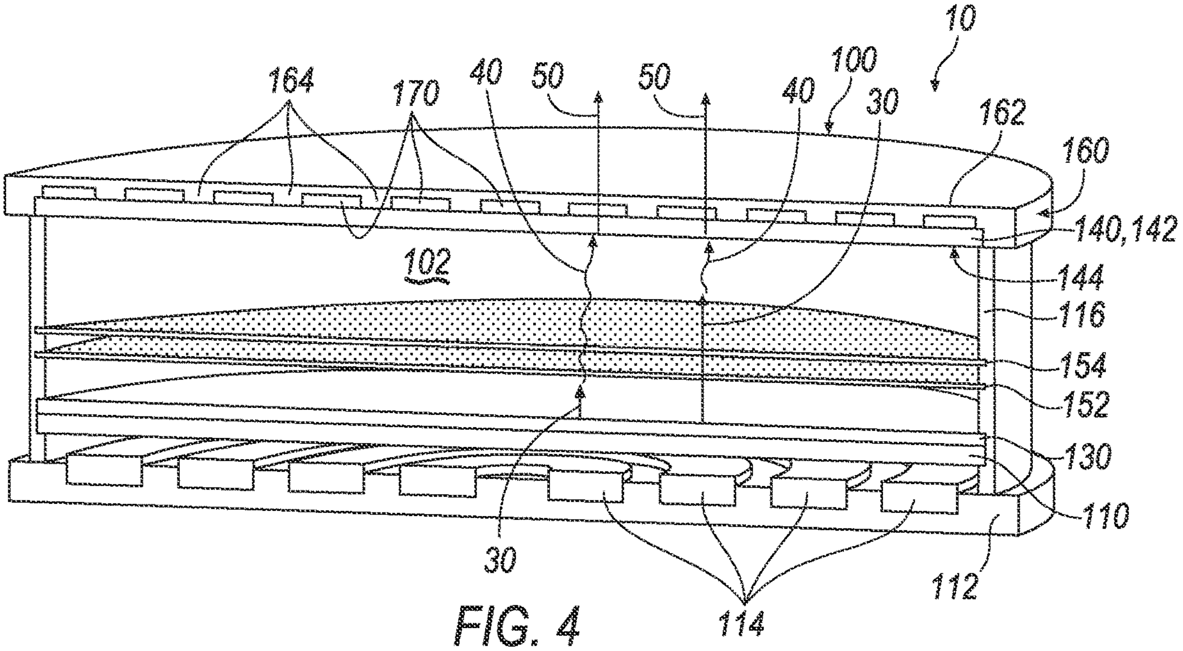
FIG. 4 is a cross-sectional perspective view of an exemplary neutron device configured to emit electrons in an axial direction.

The neutron device 10 illustrated in FIG. 4 includes a neutron emitter 100 configured to emit electrons 30 in an axial direction. In this configuration of the neutron emitter 100, the shells 110, 112, the electron source 130, the grids 152, 154, the target 140, and the cooling jacket 160 (e.g., the jacket shell 162) are disc shaped. The cover 116 is cylindrical and extends axially between the second shell 112 and the cooling jacket 160 (e.g., the jacket shell 162). The second shell 112 defines a first axial end of the neutron emitter 100 and the cooling jacket 160 (e.g., the jacket shell 162) defines an opposite, second axial end of the neutron emitter 100. The plurality of permanent magnets 114 are disposed on and/or project from an inner surface of the second shell 112 that faces axially toward the target 140. The second shell 112 and the magnets 114 are disposed axially adjacent to and spaced apart from the first shell 110 and the electron source 130. The electron source 130 is disposed on and connected to an axial surface of the first shell 110 that faces axially toward the target 140. The electron source 130 (e.g., the emitters thereof) is structured and arranged to emit electrons 30 and/or electron beams in a generally axial direction and/or toward the target 140. The biased grid 152 is disposed axially adjacent to and spaced apart from the electron source 130. The secondary grid 154 is disposed axially adjacent to and spaced apart from the biased grid 152. The target 140 is disposed axially adjacent to and spaced apart from the secondary grid 154. The cooling jacket 160 (e.g., the jacket shell 162) is disposed on and connected to an outer axial surface of the target 140 that faces axially away from the electron source 130, and the cooling jacket 160 (e.g., the jacket shell 162) circumferentially surrounds the target 140. The fluid chamber 170 is defined by and between the target 140 and the jacket shell 162. The vacuum space 102 is cylindrical and is defined (i) radially by the cylindrical cover 116 and (ii) axially by and between the first shell 110 and the target 140. While not depicted, the neutron device 10 includes one or more detectors 200.

During operation of the neutron device 10 illustrated in FIG. 4, the electrons 30 (e.g., emitted by the electron source 130) and the reaction ions 40 within the vacuum space 102 are accelerated across the vacuum space 102 in an axial direction toward the target 140 due to the voltage differential between the electron source 130 and the target 140. At least some of the neutrons 50 generated and/or emitted by the target 140 are directed outward (e.g., in an axial direction). The neutrons 50 pass through the target 140, the cooling jacket 160 (e.g., the jacket shell 162 and potentially one or more support members 164), and the coolant flowing through the fluid chamber 170 prior to reaching the desired object 70 for inspection. The speed of the emitted neutrons 50 decreases as the neutrons 50 pass through the coolant, which has been found to be an effective neutron moderator.

The neutron device 10 illustrated in FIG. 5 includes a neutron emitter 100 configured to emit electrons 30 in a radially outward direction. The coil 134 of the electron source 130 is helically wound around the rod 132 of the electron source 130. The cylindrical target 140 is disposed outside of (e.g., radially outward of) and circumferentially surrounds the electron source 130 (e.g., the rod 132 and the coil 134). The cooling jacket 160 (e.g., the jacket shell 162) is disposed on and connected to an outer circumferential surface of the target 140 that faces radially outward, and the cooling jacket 160 circumferentially surrounds the target 140. The electron source 130, the target 140, and the cooling jacket 160 extend axially between two disc-shaped covers (not shown), which are substantially similar to the covers 116$_1$, 116$_2$ depicted in FIGS. 3A and 3B. The fluid chamber 170 is (i) defined radially by and between the target 140 and the jacket shell 162 and (ii) defined axially by and between the two covers. The vacuum space 102 is annular and is defined (i) radially by and between the electron source 130 (e.g. the rod 132) and the target 140 and (ii) axially by and between the two covers. While not depicted, the neutron device 10 includes one or more detectors 200.

During operation of the neutron device 10 illustrated in FIG. 5, the power source 14 provides electricity and/or electrical current to the coil 134, which causes the coil 134 to heat up and to emit electrons 30. Ionization gas (e.g., deuterium gas) is released by the rod 132 into the vacuum space 102 due to the heat from coil 134. The electrons 30 emitted from the coil 134 are accelerated across the vacuum space 102 toward the target 140 due to a voltage differential between the electron source 130 and the target 140. The electrons 30 interact with (e.g., strike molecules of) ionization gas within the vacuum space 102, which generates and/or results in the release of reaction ions 40. The reaction ions 40 are accelerated across the vacuum space 102 toward the target 140 due to the voltage differential between the electron source 130 and the target 140. The reaction ions 40 contact, impact, and/or impinge on the target 140 and interact (e.g., react) with one or more reaction materials of the target 140, resulting in the emission of neutrons 50 from the target 140 at the point of impact. At least some of the neutrons 50 generated and/or emitted by the target 140 are directed outward (e.g., radially outward). The neutrons 50 pass through the target 140, the cooling jacket 160 (e.g., the jacket shell 162 and potentially one or more support members 164), and the coolant flowing through the fluid chamber 170 prior to reaching the desired object 70 for inspection. The speed of the emitted neutrons 50 decreases as the neutrons 50 pass through the coolant, which has been found to be an effective neutron moderator.

Figure 7:
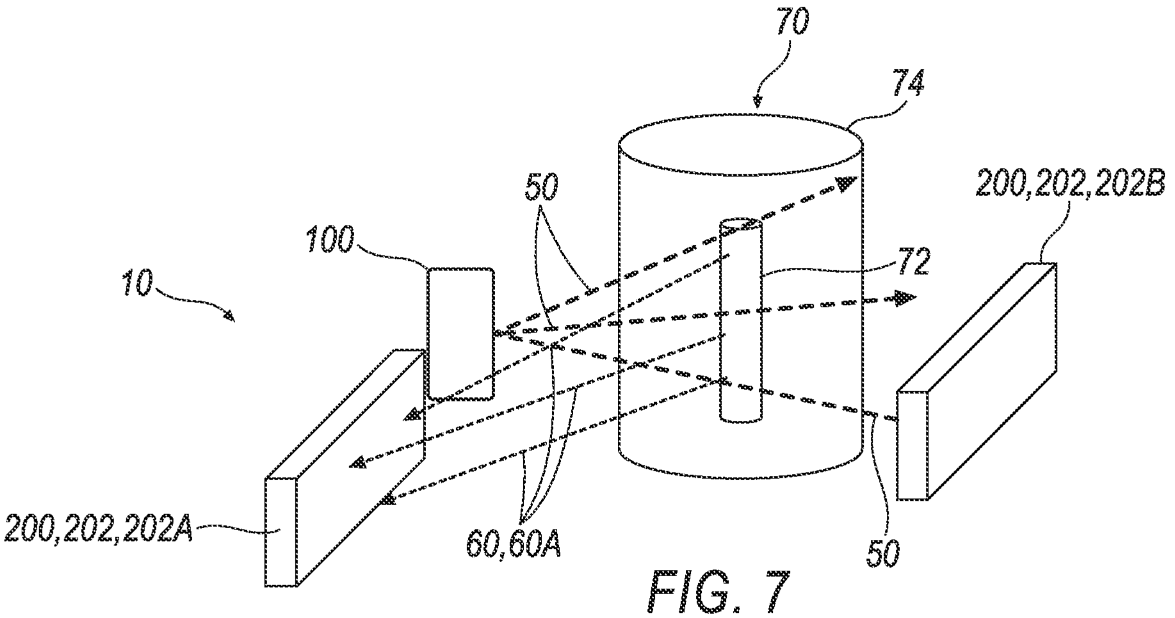
FIGS. 7-9 are basic depictions of exemplary neutron devices being utilized in the field.
Figure 8:
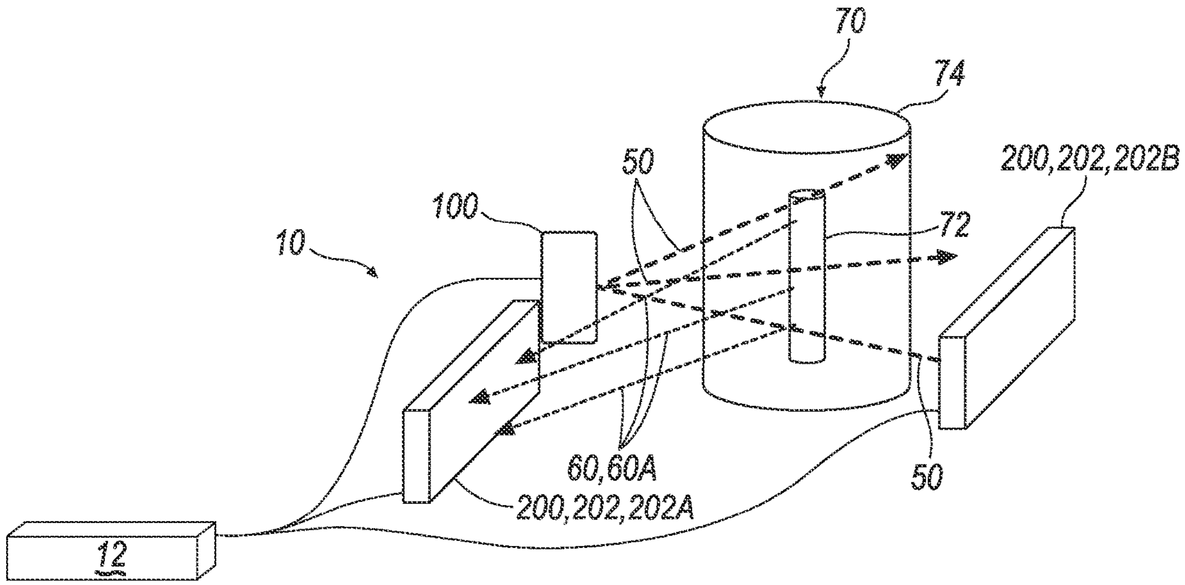

Due to its portable, light-weight, and battery-powered design, the neutron device 10 can be used in the field to perform non-destructive evaluation (NDE) tasks that cannot be accomplished with other evaluation methods (e.g., ultrasound, x-ray, infra-red radiation, eddy current, mechanical sensing). Neutron interaction with matter senses the nuclei of the constituent materials, whereas x-rays interact with the electrons in the material's atoms. As a consequence, the neutron device 10 is well suited for field NDE tasks that involve sensing water and/or hydrogen-bearing compounds and/or materials 72 that are disposed in high-density and/or thick metal containers 74 as generally illustrated in FIG. 7. For example, vehicle oil, a hydrocarbon, may be supplied to moving engine parts and/or subassemblies through metal tubing. This metal tubing may be located behind other vehicle components and/or, in military applications, thick metallic armor for example. Low-resolution transmission neutron imaging can be obtained using the neutron device 10 to determine the presence or absence of oil within the metal tubing. This example also illustrates one way in which the neutron device 10 may be utilized for verification of mechanical operability. The neutron device 10 is also particularly useful with respect to security-related tasks and/or applications since energetic compounds are rich in light atoms. For example, as generally illustrated in FIG. 8, an unidentified object 70 and/or an improvised explosive device (IED) with a thick metal container 74 may be assessed remotely using the neutron device 10 (e.g., in conjunction with long length hard wire or radio communication for control and data transfer) to determine the presence or absence of hydrogen-bearing compounds and/or materials 72 within the container 74, which information could be utilized in meaningful go/no-go determinations.

Figure 9:
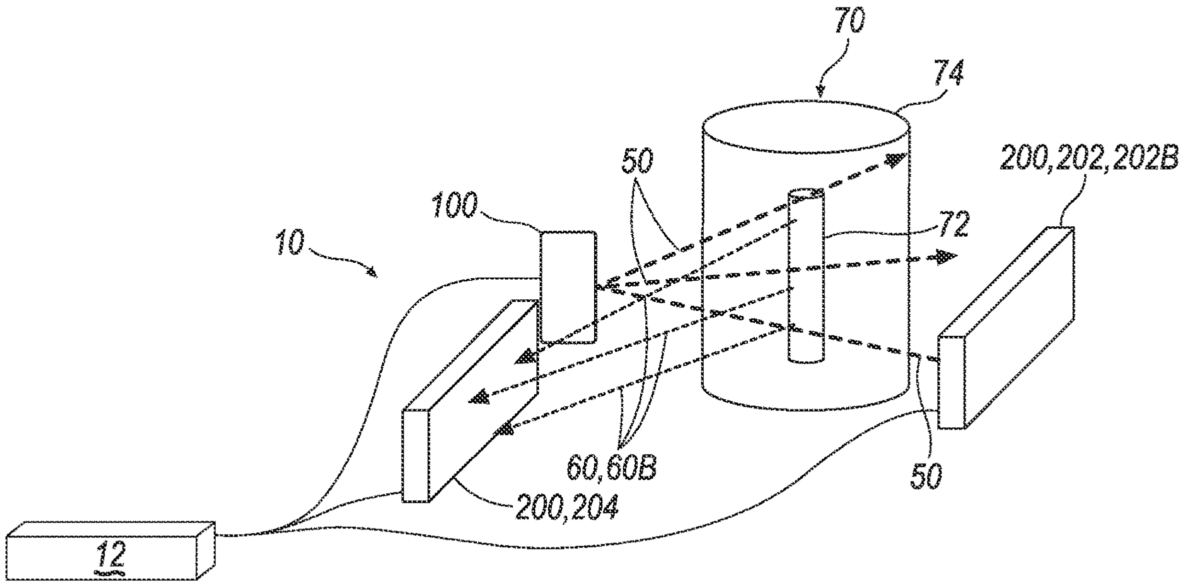

In some examples, such as generally illustrated in FIG. 9, the neutron emitter 100 includes a neutron detector 202 and a high-energy x-ray and/or gamma-ray detector 204. Neutron capture by a nucleus can result in single-energy (related to the nucleus, thus a material identification) x-ray and/or gamma-ray emission. These x-rays or gamma-rays 60B can be detected via the x-ray and/or gamma-ray detector 204.

In one exemplary and non-limiting configuration of the neutron device 10 shown in FIG. 5, the coil 134 of the electron source 130 has a diameter of 1 cm, a coil pitch of 1 cm, and a length of 33 cm. The leak and heating of coil 134 are +100 kV, and the target 140 is grounded. The target 140 is a tube and/or hollow cylinder that has a 4-inch outer diameter, is 0.039" thick, and is 8 inches long. The target 140 is composed of titanium and doped with deuterium. The titanium of the target 140 is loaded to a 2:1 atomic ratio of hydrogen, which is a beneficial ratio for estimating deuterium loading. When loaded to a 2:1 loading ratio, $TiD_2$ has a deuterium atomic number density of $1.13\times10^{23}$ atom/cm$^3$. This comes about as follows $N_{Ti}=N_{Avog}/A\times\rho_{Ti}=6.022\times10^{23}/47.867\times4.506=5.67\times10^{23}$ atom/cm$_3$ so that $2\times5.67\times10^{23}$ atom/cm$^3$=$1.13\times10^{23}$ atom/cm$^3$. Neutrons generated in the d(d,n) $^3$He reaction in $TiD_2$ at 100 keV as calculated by a MCNP6 (Monte Carlo N-Particle Transport) simulation provide a neutron spectra that is quite broad since the neutrons 50 are emitted between 0° and 180°. The total number of neutrons/deuterons averaged over a surface is $2.49\times10^{-9}$/cm$^2$ so that 1 μA of $D^+$ generates $1.55\times10^4$ n/s/cm$^2$. Since the surface area of the electron source 30 in this example is $6.38\times10^2$ cm$^2$, the total number of neutrons/deuterons generated per 1 μA of $D^+$ is $6.90\times10^6$ n/s.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

It should be understood that a controller (e.g., controller 12), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A neutron device, comprising a neutron emitter including:

a target;

an electron source configured to emit electrons toward the target when a voltage is applied between the target and the electron source; and a vacuum space in which ionization gas is disposed, the vacuum space disposed between the target and the electron source;

wherein reaction ions are released when the electrons interact with the ionization gas;

wherein neutrons are emitted from the target when the reaction ions contact the target;

wherein the neutron emitter further includes a secondary grid configured to reduce a speed of the electrons emitted by the electron source; and wherein the secondary grid is arranged in the vacuum space between the electron source and the target.

2. The neutron device of claim 1, wherein:

the ionization gas is deuterium gas; and the reaction ions are deuterium ions.

3. The neutron device of claim 1, wherein the target includes a base body that is doped with a reaction material.

4. The neutron device of claim 3, wherein the reaction material includes deuterium and/or tritium.

5. The neutron device of claim 1, wherein:

the neutron emitter further includes a biased grid configured to set a strength of an electric field in a region directly adjacent to the electron source; and the biased grid is arranged in the vacuum space between the electron source and the target.

6. A neutron device, comprising a neutron emitter including:

a target including a plurality of annular base bodies disposed axially spaced apart from one another;

an electron source configured to emit electrons toward the target when a voltage is applied between the target and the electron source; and a vacuum space in which ionization gas is disposed, the vacuum space disposed between the target and the electron source;

wherein reaction ions are released when the electrons interact with the ionization gas; and wherein neutrons are emitted from the target when the reaction ions contact the target.

7. The neutron device of claim 1, wherein:

the neutron emitter further includes a plurality of permanent magnets that influence the electrons emitted by the electron source; and the electron source is disposed between the target and the plurality of permanent magnets.

8. The neutron device of claim 7, wherein:

the neutron emitter further includes a shell supporting the plurality of permanent magnets; and the plurality of permanent magnets are arranged in an array on the shell.

9. The neutron device of claim 1, further comprising a detector configured to detect neutrons and/or gamma-rays.

10. The neutron device of claim 9, wherein the detector is attached to (i) an axial end of the neutron emitter and/or (ii) an outer circumference of the neutron emitter.

11. The neutron device of claim 9, wherein:

the detector is a reflection-mode detector that detects secondary neutrons emitted by an object being inspected when the neutrons emitted by the target interact with the object; or the detector is a transmission-mode detector that detects the neutrons emitted by the target after the neutrons have passed through an object being inspected.

12. The neutron device of claim 1, wherein the target includes a plurality of annular base bodies disposed axially spaced apart from one another.

13. The neutron device of claim 12, wherein at least one of the plurality of annular base bodies has a wedge shaped cross-section.

14. The neutron device of claim 13, further comprising a detector configured to detect neutrons and/or gamma-rays, wherein the detector includes a plurality of annular segments that are each arranged in alignment with a respective base body of the target.

15. The neutron device of claim 1, wherein:

the neutron emitter further includes a cooling jacket connected to target; and a fluid chamber through which a coolant is flowable is at least partially defined by and between the cooling jacket and the target.

16. The neutron device of claim 15, wherein the cooling jacket includes:

a jacket shell at least partially defining the fluid chamber; and a plurality of support members disposed in the fluid chamber, the plurality of support members connected to and extending between the jacket shell and the target.

17. A neutron device, comprising a neutron emitter including:

a target;

an electron source configured to emit electrons toward the target when a voltage is applied between the target and the electron source;

a biased grid configured to set a strength of an electric field in a region directly adjacent to the electron source;

a secondary grid configured to reduce a speed of the electrons emitted by the electron source; and a vacuum space in which ionization gas is disposed, the vacuum space disposed between the target and the electron source;

wherein reaction ions are released when the electrons interact with the ionization gas;

wherein the biased grid is arranged in the vacuum space between the electron source and the secondary grid; and wherein the secondary grid is arranged in the vacuum space between the biased grid and the target.

18. The neutron device of claim 6, wherein:

the neutron emitter further includes a biased grid configured to set a strength of an electric field in a region directly adjacent to the electron source;

the neutron emitter further includes a secondary grid configured to reduce a speed of the electrons emitted by the electron source;

the biased grid is arranged in the vacuum space between the electron source and the secondary grid; and the secondary grid is arranged in the vacuum space between the biased grid and the target.

19. The neutron device of claim 6, wherein at least one of the plurality of annular base bodies has a wedge shaped cross-section.

20. The neutron device of claim 19, further comprising a detector configured to detect neutrons and/or gamma-rays, wherein the detector includes a plurality of annular segments that are each arranged in alignment with a respective base body of the target.

* * * * *